US012639019B2

(12) United States Patent
Tsunoda et al.

(10) Patent No.: US 12,639,019 B2
(45) Date of Patent: May 26, 2026

(54) IMAGE FORMING SYSTEM FOR DETERMINING RECORDING MATERIAL CAPACITY REQUIREMENT

(71) Applicant: CANON KABUSHIKI KAISHA, Tokyo (JP)

(72) Inventors: Kaoru Tsunoda, Shizuoka (JP); Daisuke Momiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/952,415

(22) Filed: Nov. 19, 2024

(65) Prior Publication Data

US 2025/0173101 A1      May 29, 2025

(30) Foreign Application Priority Data

Nov. 28, 2023    (JP) ................................. 2023-200409

(51) Int. Cl.
  *G03G 15/00*          (2006.01)
  *G06F 3/12*           (2006.01)
(52) U.S. Cl.
  CPC ......... *G06F 3/126* (2013.01); *G03G 15/5016* (2013.01); *G03G 15/5029* (2013.01); *G03G 15/5087* (2013.01); *G03G 15/6502* (2013.01); *G06F 3/1203* (2013.01);
    (Continued)
(58) Field of Classification Search
  CPC ........... G03G 15/5016; G03G 15/5029; G03G 15/5087; G03G 15/6502; G03G 2215/00734; G03G 2215/00742; G03F 3/1203; G03F 3/126; G03F 3/1287
  See application file for complete search history.

(56) References Cited

U.S. PATENT DOCUMENTS

| | | | | |
|---|---|---|---|---|
| 2013/0187325 A1* | 7/2013 | Ohmiya | ............. | G03G 15/6529 271/3.14 |
| 2019/0163422 A1* | 5/2019 | Matsuo | ................. | G06F 3/1262 |
| 2019/0289140 A1* | 9/2019 | Fukui | ................. | H04N 1/00724 |

FOREIGN PATENT DOCUMENTS

| | | |
|---|---|---|
| JP | 2003108344 A | 4/2003 |
| JP | 2017151791 A | 8/2017 |

(Continued)

*Primary Examiner* — Hoang X Ngo
(74) *Attorney, Agent, or Firm* — Canon U.S.A., Inc. IP Division

(57) ABSTRACT

An image forming system includes an image forming apparatus that receives a print job including number-of-prints information, print size information, and print date-and-time information, and an acquisition unit that acquires the number-of-prints information, the size information, the date-and-time information, and capacity information indicating the maximum number of sheets to be accommodated in the accommodating portion, a determination unit that obtains, based on the information acquired by the acquisition unit, a number of print jobs in which the number of prints exceeds the maximum number of sheets to be accommodated, out of a plurality of the print jobs received by the image forming apparatus during a predetermined period, to determine whether the number is greater than a predetermined threshold, and a notification unit that notifies a content about an addition of a new accommodating portion if the determination unit determines that the number exceeds the predetermined threshold.

18 Claims, 7 Drawing Sheets

(52) U.S. Cl.
CPC . G06F 3/1284 (2013.01); *G03G 2215/00734*
(2013.01); *G03G 2215/00742* (2013.01)

(56) References Cited

FOREIGN PATENT DOCUMENTS

| | | | |
|----|-------------|---|---------|
| JP | 2017209881  | A | 11/2017 |
| JP | 2019164517  | A | 9/2019  |

* cited by examiner

Figure 4:
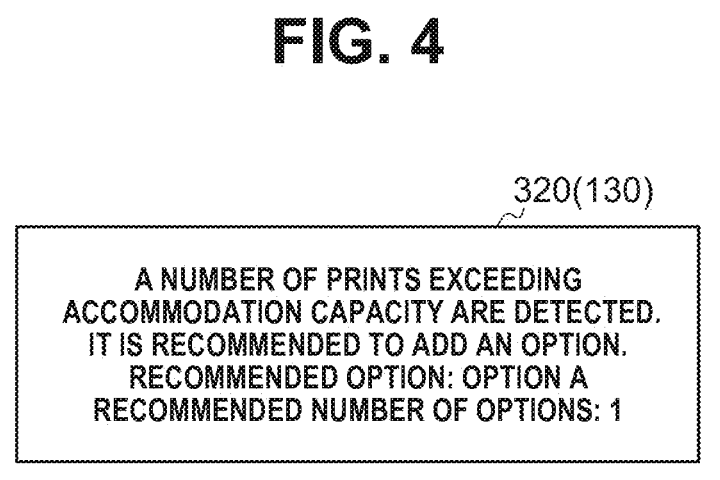

A NUMBER OF PRINTS EXCEEDING
ACCOMMODATION CAPACITY ARE DETECTED.
IT IS RECOMMENDED TO ADD AN OPTION.
RECOMMENDED OPTION: OPTION A
RECOMMENDED NUMBER OF OPTIONS: 1

FIG. 6

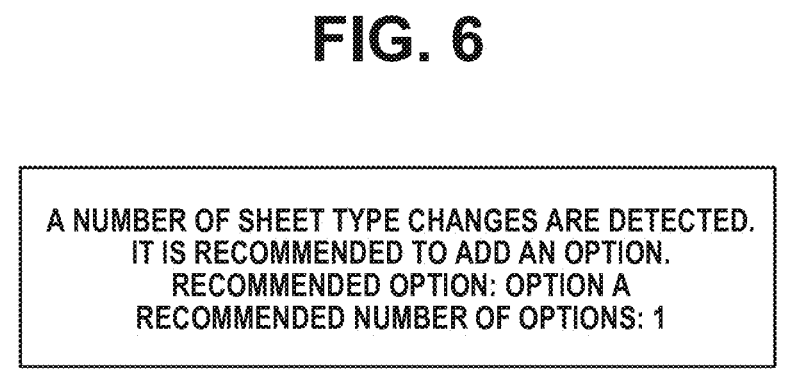

A NUMBER OF SHEET TYPE CHANGES ARE DETECTED.
IT IS RECOMMENDED TO ADD AN OPTION.
RECOMMENDED OPTION: OPTION A
RECOMMENDED NUMBER OF OPTIONS: 1

IMAGE FORMING SYSTEM FOR DETERMINING RECORDING MATERIAL CAPACITY REQUIREMENT

BACKGROUND

Field

The present disclosure relates to an image forming system for forming an image on a recording material.

Description of the Related Art

An image forming apparatus discussed in Japanese Patent Application Laid-Open No. 2003-108344 records the number of prints performed by a user per month and the number of recording materials in a cassette of the image forming apparatus is used by the user, and proposes an option to the user. In proposing the option, it is desirable to understand not only the usage condition described above but also various usage conditions of the user.

SUMMARY

The present disclosure is directed to providing a new type of image forming apparatus capable of understanding a usage condition of a user and proposing an option.

One aspect of the present disclosure is as follows.

According to an aspect of the present disclosure, an image forming system includes an image forming apparatus including an accommodating portion that accommodates recording materials, the image forming apparatus being configured to receive a print job including number-of-sheets information indicating the number of prints, size information indicating a size of a recording material to be printed, and date-and-time information indicating a date and time of a print, and to form an image on the recording material based on the print job, and an acquisition unit that acquires the number-of-sheets information, the size information, the date-and-time information, in the received print job, and capacity information indicating a maximum number of sheets that the accommodating portion can accommodate the recording material having a size specified in the print job, a determination unit that obtains, based on the number-of-sheets information, the size information, the date-and-time information, and the capacity information that are acquired by the acquisition unit, a number of print jobs in which the number of prints exceeds the maximum number of sheets to be accommodated, out of a plurality of print jobs received by the image forming apparatus during a predetermined period, and to determine whether the number of print jobs is greater than or equal to a predetermined threshold, and a notification unit that notifies a content about an addition of a new accommodating portion in a case where the determination unit determines that the number of print jobs exceeds the predetermined threshold.

Further features of the present disclosure will become apparent from the following description of exemplary embodiments with reference to the attached drawings.

BRIEF DESCRIPTION OF THE DRAWINGS

FIG. 4 is a schematic diagram illustrating a display unit according to the first exemplary embodiment.

FIG. 6 is a schematic diagram of a display unit according to the second exemplary embodiment.

DESCRIPTION OF THE EMBODIMENT

Configuration of Image Forming Apparatus

Figure 1:
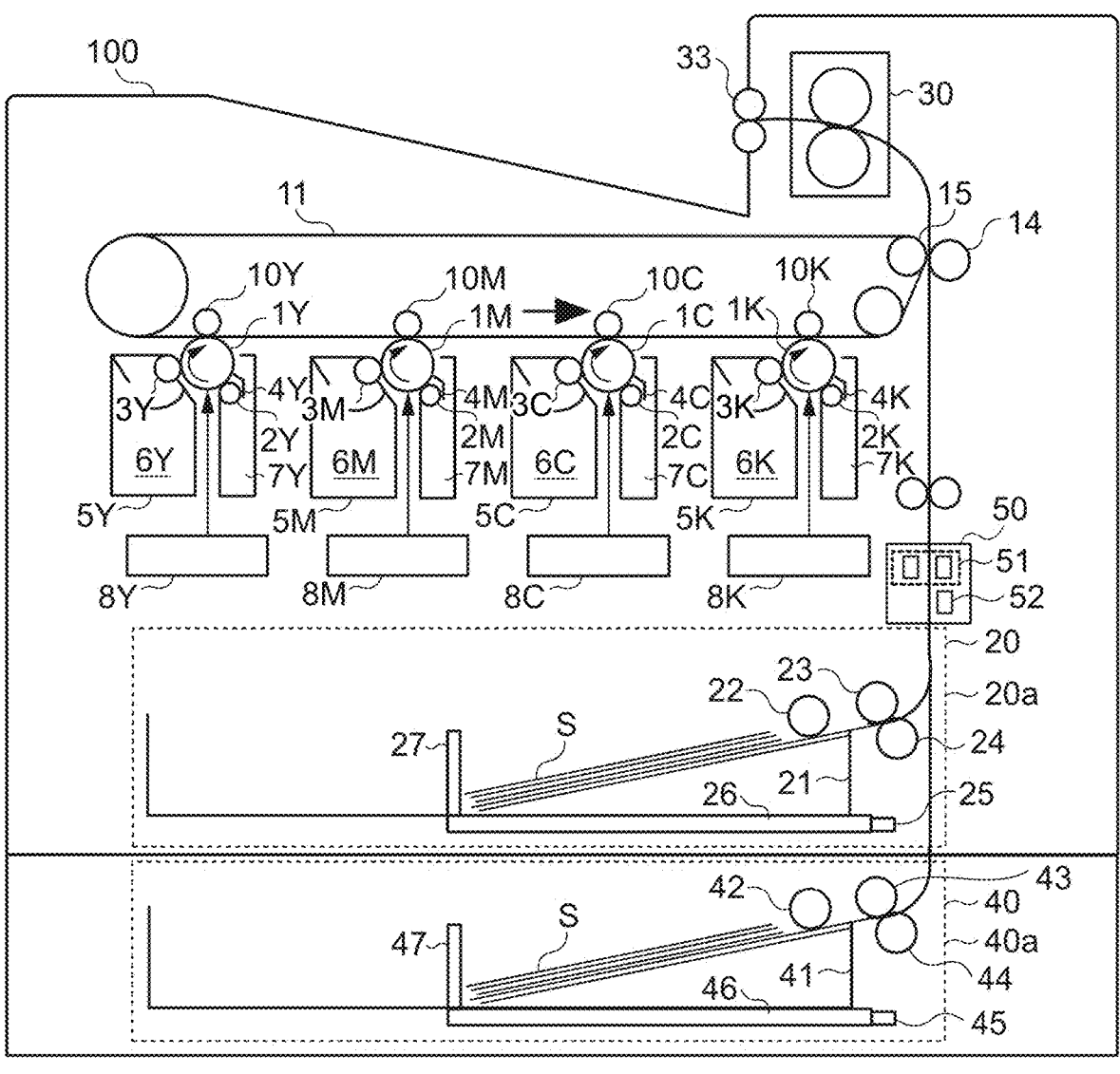
FIG. 1 is a schematic diagram illustrating an image forming apparatus according to a first and second exemplary embodiments.

A configuration of an image forming apparatus 100 according to a first exemplary embodiment will now be described with reference to FIG. 1. FIG. 1 is a schematic diagram of the image forming apparatus 100. The image forming apparatus 100 is a laser beam printer for forming an image on a recording material using an electrophotographic method. The image forming apparatus 100 is a tandem-type color laser beam printer configured to output color images by superimposing four color toners: yellow (Y), magenta (M), cyan (C), and black (K). In FIG. 1, the letters Y, M, C, and K at the end of the reference numerals indicate that toner colors processed by corresponding members are yellow, magenta, cyan, and black, respectively. In the following description, reference numerals without the last letters are used if the colors are not distinguished.

A process cartridge 5 includes a toner container 6, a photosensitive member 1, a charge roller 2, a development roller 3, a drum cleaning blade 4, and a waste-toner container 7. The charge roller 2 charges a surface of the photosensitive member 1 to a predetermined potential. A laser unit 8 is disposed below the process cartridge 5 and exposes the photosensitive drum 1 based on an image signal to form an electrostatic latent image. The development roller 3 develops the electrostatic latent image on the photosensitive member 1 using the toner accommodated in the toner container 6 to form a developer image.

The image forming apparatus 100 also includes an intermediate transfer body 11, a primary transfer roller 10, a secondary transfer roller 14, and a facing roller 15. The primary transfer roller 10 is a transfer member configured to output a primary transfer bias and transfer the developer image on the photosensitive member 1 to the intermediate transfer body 11. Toner images formed on the photosensitive members 1Y to 1K are primarily transferred to the intermediate transfer body 11 in the order of Y, M, C, and K.

The image forming apparatus 100 also includes a sheet feed unit 20 and an option 40. The sheet feed unit 20 includes a main body accommodating portion 21 and a housing 20a. The main body accommodating portion 21 may be inserted to or withdrawn from the housing 20a. The housing 20a includes a sheet feeding roller 22, a conveyance roller 23, and a separation roller 24. The main body accommodating portion 21 is an accommodating portion configured to accommodate recording materials S. The sheet feeding roller 22 is a sheet feed portion configured to feed a recording material from the main body accommodating portion 21. The recording material fed by the sheet feeding roller 22 is separated into one sheet by the separation roller 24 and conveyed by the conveyance roller 23 to the secondary transfer roller 14.

The image forming apparatus 100 can be connected to at least one or more options below the image forming apparatus 100. In the present exemplary embodiment, the option 40 serving as an accommodating portion (accommodating device) capable of accommodating the recording material is connected at a lower portion of the image forming apparatus 100. The option 40 includes an option accommodating portion 41 and a first housing 40a. The option accommodating portion 41 may be inserted or withdrawn relative to the first housing 40a. The first housing 40a includes a first sheet feeding roller 42, a first conveyance roller 43, and a first separation roller 44. The option accommodating portion 41 accommodates the recording materials S. The first sheet feeding roller 42 is configured to feed the recording material from the option accommodating portion 41. The recording material fed by the first sheet feeding roller 42 is separated by the first separation roller 44 into one sheet and conveyed by the first conveyance roller 43 to the secondary transfer roller 14.

In the following description, the main body accommodating portion 21 and the option accommodating portion 41 may be referred to as an accommodating portion.

The secondary transfer roller 14 transfers the toner image on the intermediate transfer body 11 from the sheet feed unit 20 or the option 40 to the conveyed recording material. A fixing unit 30 heats and pressurizes the recording material and fixes the toner image transferred to the recording material with the secondary transfer roller 14. The recording material fixed by the fixing unit 30 is discharged from the image forming apparatus 100 by a discharge roller pair 33.

The image forming apparatus 100 includes a sheet type detection unit 50 configured to detect the type of the recording material fed from the sheet feeding roller 22. The sheet type detection unit 50 is provided to face the conveyance path of the recording material. The sheet type detection unit 50 is provided between the sheet feeding roller 22 and the secondary transfer roller 14 in the conveyance direction of the recording material. The sheet type detection unit 50 detects a type of the recording material passing through the sheet type detection unit 50. In the present exemplary embodiment, the sheet type detection unit 50 includes a basis weight detection unit 51 for detecting a basis weight of the recording material and a surface property detection unit 52 for detecting a surface property of the recording material. The basis weight detection unit 51 includes a transmission unit for transmitting an ultrasonic wave and a reception unit for receiving the ultrasonic wave. The basis weight detection unit 51 causes the transmission unit to send an ultrasonic wave to the recording material and the reception unit to receive the ultrasonic wave passing through the recording material, thereby detecting the basis weight of the recording material to detect the type of sheet. In contrast, the surface property detection unit 52 includes a light emission portion and a light reception portion. As a result of the recording material irradiated with light from the light emission unit and the light reception unit receiving reflected light from the recording material, the surface property detection unit 52 detects a surface property of the recording material (roughness of the recording material and the like) to detect the type of sheet. The sheet type detection unit 50 according to the present exemplary embodiment includes both the basis weight detection unit 51 and the surface property detection unit 52. However, the sheet type detection unit 50 may include at least one or more of the basis weight detection unit 51 and the surface property detection unit 52.

The image forming apparatus 100 according to the present exemplary embodiment is capable of detecting the size of the recording material accommodated in the main body accommodating portion 21. The main body accommodating portion 21 includes a regulation portion 27 and a depressing member 26. The housing 20a includes a size detection unit 25. The regulation portion 27 is a regulation portion for regulating an upstream end (rear end) in the recording material conveyance direction of the recording material stacked in the main body accommodating portion 21. A user can move the regulation portion 27 to regulate the rear end of the recording material having various sizes, such as A4 and A3. The depressing member 26 moves along with movement of the regulation portion 27 and depresses depressed units 25a to 25d described below.

Figure 2:
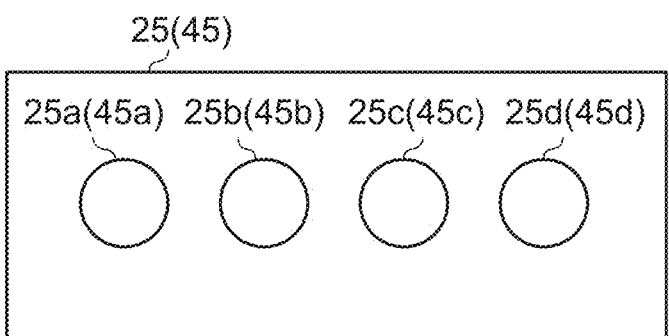
FIG. 2 is a schematic diagram illustrating a size detection unit according to the first and second exemplary embodiments.

The size detection unit 25 will be described with reference to FIGS. 1 and 2. FIG. 2 is a plan view of the size detection unit 25. The size detection unit 25 detects the size of the recording material accommodated in the main body accommodating portion 21. The size detection unit 25 includes depressed portions 25a to 25d. When the main body accommodating portion 21 is inserted into the housing 20a and the regulation portion 27 is moved, at least one or more of the depressed portions 25a to 25d are depressed in the depressing member 26. In other words, depending on the position where the regulation portion 27 is moved, a combination of the depressed portions 25a to 25d differs, and as a result, it is possible to detect the sheet size. If the main body accommodating portion 21 is withdrawn from the housing 20a, none of the depressed portions 25a to 25d are depressed. The size detection unit 25 can thereby detect a state (withdrawn state) in which the main body accommodating portion 21 is withdrawn from the housing 20a. On the other hand, if at least one or more of the depressed portions 25a to 25d are depressed, it is possible to detect that the main body accommodating portion 21 is inserted into the housing 20a (in an inserted state). That is, it is also possible to refer to the size detection unit 25 as a state detection unit for detecting whether the main body accommodating portion 21 is in the inserted state or the withdrawn state with respect to a main body of the image forming apparatus 100.

The method of detecting the size of the recording material accommodated in the option accommodating portion 41 is also the same as in the case of the main body accommodating portion 21, and thus the latter will not be described. That is, as illustrated in FIGS. 1 and 2, the option accommodating portion 41 includes a first regulation portion 47 and a first depressing member 46. The first housing 40a includes a first size detection unit 45 for detecting the size of the recording material accommodated in the option accommodating portion 41. The first size detection unit 45 includes first depressed portions 45a to 45d.

Configuration of Image Forming System

Figure 3:
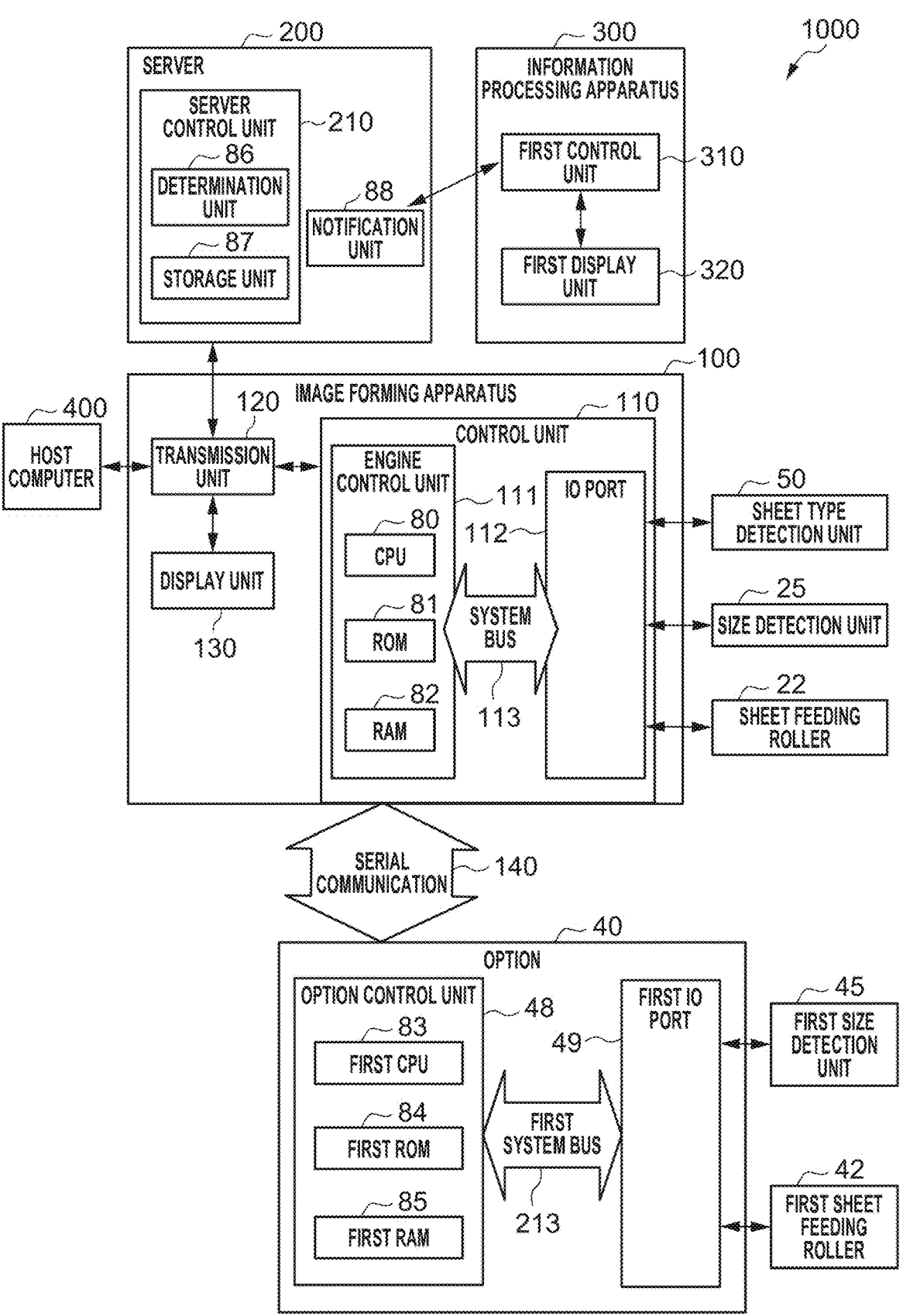
FIG. 3 is a schematic diagram illustrating an image forming system according to the first and second exemplary embodiments.

A configuration of an image forming system 1000 in the present exemplary embodiment will now be described with reference to FIG. 3. FIG. 3 is a diagram illustrating the configuration of the image forming system 1000. The image forming system 1000 is a system including the image forming apparatus 100, the option 40, a server 200, and a management device (information processing apparatus) 300. First, the image forming apparatus 100 will be described.

The image forming apparatus 100 receives a print job and forms an image on a recording material, based on the received print job. The print job includes date-and-time information, size information, and number of sheets information described below. The image forming apparatus 100 includes a transmission unit 120, a display unit 130, and a control unit 110. The transmission unit 120 transmits a print job transmitted from a host computer 400 to the control unit 110. The display unit 130 includes a display on which information is displayed and an operation unit capable of operating the image forming apparatus 100. The user can set a print condition from the operation unit.

The control unit 110 controls an image-forming operation. The control unit 110 includes an engine control unit 111, an input-output (IO) port 112, and a system bus 113. The engine control unit 111 includes a central processing unit (CPU) 80, a read only memory (ROM) 81, and a random access memory (RAM) 82. The CPU 80 loads a program and various types of data from the ROM 81 and executes the program by using the RAM 82 as a work area. The ROM 81 is a storage member to store data. The engine control unit 111 is communicable with the IO port 112 via the system bus 113. The IO port 112 is connected with the sheet type detection unit 50, the size detection unit 25, and the sheet feeding roller 22. The CPU 80 controls the sheet type detection unit 50, the size detection unit 25, and the sheet feeding roller 22 via the IO port 112. The engine control unit 111 is also communicable with a below-described option control unit 48 of the option 40 via a bidirectionally communicable serial communication 140 to control the first sheet feeding roller 42.

That is, upon receiving a printer instruction (print job), the engine control unit 111 can drive the sheet feeding roller 22 or the first sheet feeding roller 42 to feed the recording material.

Next, the option 40 will be described. The option 40 includes an option control unit 48, a first IO port 49, and a first system bus 213. The option control unit 48 controls a sheet feeding operation of the option 40. The option control unit 48 includes a first CPU 83, a first ROM 84, and a first RAM 85. The first ROM 84 is a storage member where data is stored. The first CPU 83 loads a program and various types of data from the first ROM 84 and executes the program by using the first RAM 85 as a work area. The option control unit 48 is communicable with the first IO port 49 via the first system bus 213. The first IO port 49 is connected with the first size detection unit 45 and the first sheet feeding roller 42.

That is, the first CPU 83 controls the first size detection unit 45 and the first sheet feeding roller 42 via the first IO port 49. The engine control unit 111 directs the first CPU 83 to control the first IO port 49 via a serial communication 140. It is possible to record information recorded in the first RAM 85 into the RAM 82 via the serial communication 140.

Next, the server 200 will be described. The server 200 includes a notification unit 88 and a server control unit 210, which is communicable with the transmission unit 120. The server control unit 210 includes a determination unit 86 and a storage unit 87. The storage unit 87 stores information (data) transmitted from the transmission unit 120 of the image forming apparatus 100. The determination unit 86 includes a calculation processing device, such as a CPU, for executing a program stored in the storage unit 87. As described below, the determination unit 86 uses data transmitted from the transmission unit 120 to determine whether an additional sheet feeding option is required. The server 200 is communicable with an information processing apparatus 300 described below and may transmit information to the first control unit 310. Specifically, in a case where the determination unit 86 determines that it is necessary to add a sheet feeding option, the notification unit 88 notifies the information processing apparatus 300 described below of the information.

Next, the information processing apparatus 300 will be described. The information processing apparatus 300 in the present exemplary embodiment is specifically a personal computer. It is noted that the information processing apparatus 300 is not only a personal computer but also a tablet terminal. The information processing apparatus 300 includes a first control unit 310 and a first display unit 320. The first control unit 310 receives data transmitted from the server control unit 210 and controls the first display unit 320 to display various information. The first display unit 320 includes a display capable of displaying information and an operation unit capable of operating the information processing apparatus 300.

Data Collection

Next, a configuration for data collection by the image forming system 1000 will be described. The engine control unit 111 is an acquisition unit to acquire various information about the image forming apparatus 100 and the option 40. The acquired information is transmitted to the server 200 and used for analysis described below. The engine control unit 111 stores the acquired various information in the RAM 82.

The engine control unit 111 acquires date-and-time information that is information about a date and time of printing, such as a date and time when a print job is received and a date and time when a print job is executed, and stores the date-and-time information in the RAM 82. The engine control unit 111 acquires the number of sheets information, such as the number of prints of the recording material scheduled for the print job and the number of prints actually printed, and stores the number of sheets information in the RAM 82. The engine control unit 111 acquires the size information that is information indicating the size of the recording material specified in the print job, and stores the size information in the RAM 82. The engine control unit 111 also stores, based on the print job, information about the sheet feed unit 20, which is driven by the engine control unit 111, or the option 40.

As described above, the size detection unit 25 and the first size detection unit 45 each detect whether the main body accommodating portion 21 and the option accommodating portion 41 are in the withdrawn state or in the inserted state. The engine control unit 111 acquires state information, such as a state of the accommodating portion and a date and time when the state of the accommodating portion changes, from detection results of the size detection unit 25 and the first size detection unit 45, and stores the state information in the RAM 82.

The engine control unit 111 regularly communicates with the option 40 via the serial communication 140. The engine control unit 111 acquires option connection information, such as presence or absence of connection of the option 40 and the number of connected options, and stores the option connection information in the RAM 82. The engine control unit 111 also acquires the maximum number of options connectable to the image forming apparatus 100 (option capacity information) and stores such a number in the RAM 82.

In a case where the engine control unit 111 determines that the option 40 is connected to the image forming apparatus 100, the engine control unit 111 stores the maximum number

7 | 8 of sheets to be accommodated (capacity information), which is the number of recording materials that the option accommodating portion 41 of the option 40 can accommodate, in the RAM 82. More specifically, the maximum number of sheets to be accommodated is the maximum number of recording materials having any size to be accommodated. For example, if the option 40 is capable of accommodating up to 300 A4-sized sheets, then the maximum number of sheets to be accommodated for the A4-sized sheets in the option 40 is 300. The maximum number of sheets to be accommodated can be determined based on a detection result of a sensor for detecting that the recording material accommodated in the accommodating portion exceeds a predetermined amount. The maximum number of sheets to be accommodated can also be the number of sheets described in a product manual of the option 40.

Similarly, the engine control unit 111 also stores, in the RAM 82, the maximum number of sheets to be accommodated in the main body accommodating portion 21 of the sheet feed unit 20. In the present exemplary embodiment, the engine control unit 111 stores the maximum number of sheets to be accommodated, in the RAM 82. However, the maximum number of sheets to be accommodated in the sheet feed unit 20 and the option 40 may be previously stored in the RAM 82.

The engine control unit 111 stores the size of the recording material accommodated in the sheet feed unit 20 and the option 40 detected by the size detection unit 25 and the first size detection unit 45, as well as the date and time of detection, in the RAM 82.

Thus, the information acquired by the engine control unit 111 and stored in the RAM 82 described above is transmitted by the transmission unit 120 to the server control unit 210 and saved in the storage unit 87. The server control unit 210 may also be referred to as an acquisition unit for acquiring information.

Various information is saved in association with each event, such as a print job and a change in the state of the accommodating portion. Examples of information saved in the storage unit 87 are shown in Table 1, Table 2, and Table 3.

Table 1 stores a date and time of an event (operation) that occurs and a type of event in relation to each other. If a print job is received and print is performed, "Print" is is indicated. If the accommodating portion is withdrawn or inserted, "Withdrawn" or "Inserted" is indicated. If an operation is printing, the number of prints specified in the print job, the size of the recording material specified in the print job, and the accommodating portion from which the sheet is fed are described.

TABLE 1

| Date and Time | Operation | Specified number of prints | Specified size of recording material | Accommodating portion |
|---|---|---|---|---|
| 2023 Jun. 1 11:00:00 | Print | 100 | A4 | Main body accommodating portion |
| 2023 Jun. 1 12:00:00 | Print | 500 | A4 | Main body accommodating portion |
| 2023 Jun. 1 12:10:00 | Withdrawn | — | — | Main body accommodating portion |
| 2023 Jun. 1 12:15:00 | Inserted | — | — | Main body accommodating |

TABLE 1-continued

| Date and Time | Operation | Specified number of prints | Specified size of recording material | Accommodating portion |
|---|---|---|---|---|
| | | | | portion |
| 2023 Jun. 1 12:30:00 | Instruct to print | 400 | A4 | Main body accommodating portion |
| 2023 Jun. 1 14:00:00 | Instruct to print | 100 | A5 | Option accommodating portion |
| 2023 Jun. 1 15:00:00 | Instruct to print | 400 | A4 | Main body accommodating portion |
| 2023 Jun. 1 15:10:00 | Withdrawn | — | — | Main body accommodating portion |
| 2023 Jun. 1 15:15:00 | Inserted | — | — | Main body accommodating portion |
| 2023 Jun. 1 16:30:00 | Instruct to print | 300 | A4 | Main body accommodating portion |
| 2023 Jun. 1 17:00:00 | Instruct to print | 100 | A5 | Option accommodating portion |
| 2023 Jun. 1 18:00:00 | Instruct to print | 400 | A4 | Main body accommodating portion |

Table 2 shows information about the configuration of the main body accommodating portion 21 and the option accommodating portion 41. The maximum number of sheets to be accommodated of each sheet size for each of the main body accommodating portion 21 and the option accommodating portion 41, the number of options connected to the image forming apparatus 100, and the maximum number of options connectable to the image forming apparatus 100 are described.

TABLE 2

| Max No. of sheets to be accommodated (main body accommodating portion) | Max No. of sheets to be accommodated (option accommodating portion) | No. of connected options | Max No. of connectable options |
|---|---|---|---|
| A4: 300 A5: 300 | A4: 200 A4: 200 | 1 | 2 |

Table 3 shows the date and time when the size detection unit 25 and the first size detection unit 45 detect a size, and the size of the recording material accommodated by the main body accommodating portion 21 and the option accommodating portion 41.

TABLE 3

| Date and Time | Recording material size (main body accommodating portion) | Recording material size (option accommodating portion) |
|---|---|---|
| 2023 Jun. 1 11:00:00 | A4 | A5 |

Determination of Addition of Options

Next, a method of proposing, by the image forming system 1000, an addition of the options in the present exemplary embodiment will be described. It is noted that in the following description, a system including the main body accommodating portion 21 and the option accommodating portion 41 may be referred to as an accommodating unit.

In some cases, the specified number of prints in a single print job specified by the user is greater than the maximum number of sheets to be accommodated in the accommodating unit of the image forming system 1000. For example, there is a case where a print job includes an instruction to print on 600 A4-sized recording materials, but a total maximum number of A4-sized sheets that the main body accommodating portion 21 and the option accommodating portion 41 can accommodate is 500. In such a case, the user needs to replenish the accommodating unit with recording materials. According to the present exemplary embodiment, in a case where such a case occurs a predetermined number of times or more within a predetermined period, a content concerning an addition of a new accommodating portion (option) is notified to the user. In the present exemplary embodiment, the information acquired by the engine control unit 111 described above and stored in the RAM 82 is transmitted to the server control unit 210 and is used for analysis described below.

Table 4 shows the date and time, the specified number of prints (P1), and the instructed size of the recording material, for each print job in the information in Tables 1 to 3. Table 4 also shows the size of the recording material accommodated in the main body accommodating portion 21 and the size of the recording material accommodated in the option accommodating portion 41, detected by the size detection unit 25 and the first size detection unit 45. Table 4 also shows the maximum number of sheets to be accommodated of the accommodating unit in the recording material having the size specified in the print job. For example, at 11:00:00 on Jun. 1, 2023, the specified size of the recording material is A4. The size of the recording material in the main body accommodating portion 21 is A4 and the size of the recording material in the option accommodating portion 41 is A5, and thus, the maximum number of sheets to be accommodated of the accommodating units is 300. Table 4 also shows whether the specified number of prints (P1) is greater than the maximum number of sheets to be accommodated (P2) of the accommodating units in the recording material having the size specified in the print job.

The determination unit 86 calculates the number ($\alpha$) of print jobs that satisfies P1>P2 among print jobs performed in a predetermined period, and determines whether the number of print jobs satisfying P1>P2 is greater than or equal to a predetermined threshold ($\beta$). That is, the determination unit 86 obtains the number ($\alpha$) of print jobs where the number of prints exceeds the maximum number of sheets to be accommodated, from among a plurality of the print jobs received by the image forming apparatus 100 in a predetermined period, based on the number of sheets information, the size information, the date-and-time information, and the capacity information. The determination unit 86 then determines whether $\alpha$ is greater than or equal to a predetermined threshold ($\beta$). The predetermined period may be, for example, one day. When Table 4 is used as an example, the number of print jobs satisfying P1>P2 is four, and if the predetermined threshold ($\beta$) is 3, $\alpha$>$\beta$ is satisfied.

In a case where the determination unit 86 determines that the number of print jobs satisfying P1>P2 is greater than or equal to the predetermined threshold, the determination unit 86 uses the information in Table 2 to determine whether it is possible to add the option to the image forming apparatus 100. Specifically, the determination unit 86 determines, whether $\gamma$, which is the number of options connectable to the image forming apparatus 100, is greater than $\delta$, which is the number of options connected to the image forming apparatus, based on the option capacity information and the option connection information. In the present exemplary embodiment, the number of options to be connected is one and the maximum number of connectable options is two, and thus it is possible to add the options. The determination unit 86 therefore determines that it is possible to add the option to the image forming apparatus 100.

Next, the notification of information will be described. In a case where the determination unit 86 determines that the addition of the options to the image forming apparatus 100 is necessary according to the above method, the notification unit 88 notifies the first control unit 310 of the information processing apparatus 300 of information about the addition of options. In other words, the notification unit 88 notifies the contents of the option addition in a case where the determination unit 86 determines that a is greater than $\beta$ and $\gamma$ is greater than $\delta$.

TABLE 4

| Date and Time | Specified number of prints (P1) | Specified size of recording material | Recording material size (main body accommodating portion) | Recording material size (option accommodating portion) | Max No. of sheets having specified size to be accommodated in accommodating unit (P2) | P1 > P2 |
|---|---|---|---|---|---|---|
| 2023 Jun. 1 11:00:00 | 100 | A4 | A4 | A5 | 300 | No |
| 2023 Jun. 1 12:00:00 | 500 | A4 | A4 | A5 | 300 | Yes |
| 2023 Jun. 1 12:30:00 | 400 | A4 | A4 | A5 | 300 | Yes |
| 2023 Jun. 1 14:00:00 | 100 | A5 | A4 | A5 | 200 | No |
| 2023 Jun. 1 15:00:00 | 400 | A4 | A4 | A5 | 300 | Yes |
| 2023 Jun. 1 16:30:00 | 300 | A4 | A4 | A5 | 300 | No |
| 2023 Jun. 1 17:00:00 | 100 | A5 | A4 | A5 | 200 | No |
| 2023 Jun. 1 18:00:00 | 400 | A4 | A4 | A5 | 300 | Yes |

The first control unit 310 having received the notification from the notification unit 88 causes the first display unit 320 to display the information about the addition of options notified by the notification unit 88. In the present exemplary embodiment, a dealer manages a state of the image forming apparatus 100 by using the information processing apparatus 300, and proposes the addition of options to the user using the image forming apparatus 100 based on the information displayed in the first display unit 320.

FIG. 4 is a diagram illustrating the information displayed in the first display unit 320. As illustrated in FIG. 4, the first display unit 320 displays a content related to a user's printing tendency, such as that a print job specifying the number of prints in excess of the maximum number of sheets to be accommodated in the accommodating unit is performed. The first display unit 320 displays information about a content proposing the addition of options. The first display unit 320 proposes the type and number of recommended options. That is, the first display unit 320 displays at least one or more of the contents for proposing the addition of options or the user's printing tendency.

In the present exemplary embodiment, the notification unit 88 notifies the information processing apparatus 300 of the information related to the addition of options. However, the first control unit 310 having received the notification from the notification unit 88 may display, in the first display unit 320, the information stored in the information processing apparatus 300.

In the present exemplary embodiment, the notification unit 88 notifies the information processing apparatus 300 of the information, but the notification unit 88 may notify the image forming apparatus 100 and the image forming apparatus 100 having received the notification may display the information in the display unit 130.

Determination Flow

Figure 5:
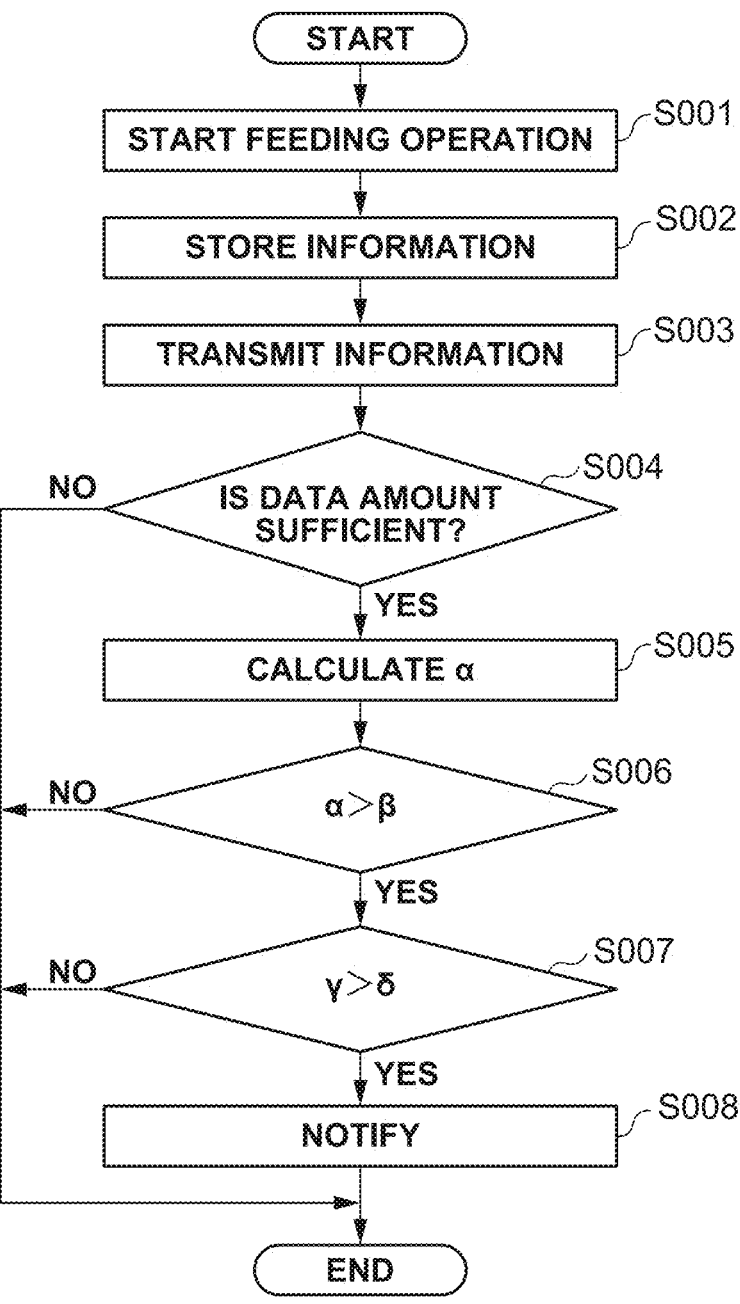
FIG. 5 is a determination flowchart according to the first exemplary embodiment.

Next, a determination flow in the present exemplary embodiment will be described with reference to FIG. 5. When the transmission unit 120 receives a print job in step S001, the engine control unit 111 drives the sheet feed unit 20 or the option 40 to start the sheet feed operation. In step S002, the engine control unit 111 stores information about the received print job in the RAM 82. The engine control unit 111 also periodically acquires the information described above and stores such information in the RAM 82. In step S003, the transmission unit 120 transmits such information to the server 200, and the information is stored in the storage unit 87. That is, the transmission unit 120 transmits, for example, information about the number of sheets, information about the size, information about the date-and-time, and information about the capacity, to the server 200. The frequency of transmission is, for example, once a day, but the transmission may be performed at any timing.

In step S004, the server 200 determines whether data to be used for the determination by the unit 86 is collected. In a case where not enough data is collected (NO in step S004), no determination is made. In a case where enough data is collected (YES in step S004), the determination is started. In the present exemplary embodiment, the determination is made when the data for one day is collected, but the timing of the analysis may be changed as appropriate. In step S005, the determination unit 86 calculates α, which is the number of print jobs satisfying P1>P2. In step S006, the determination unit 86 determines, as described above, whether α is greater than a predetermined threshold β. In a case where α is not greater than the predetermined threshold β (NO in step S006), the analysis is ended. In a case where α is greater than the predetermined threshold β (YES in step S006), the determination unit 86 determines whether it is possible to add the option to the image forming apparatus 100. In step S007, the determination unit 86 determines whether γ, which is the maximum number of connectable options, is greater than δ, which is the number of options connected. If γ is not greater than δ (NO in step S007), the flowchart is ended. If γ is greater than δ (YES in step S007), the processing proceeds to step S007. In step S008, the notification unit 88 notifies the information processing apparatus 300 of the information about the addition of options. The information processing apparatus 300 having received the notification displays the information about the addition of options notified by the notification unit 88 in the first display unit 320.

As described above, the disclosure according to the present exemplary embodiment can understand the usage status of the user and make a proposal about the options.

A second exemplary embodiment will now be described. The user may frequently extract the recording material accommodated in the accommodating portion and perform a process of replenishing the accommodating portion with a recording material different in type of the accommodated recording material. The second exemplary embodiment notifies such a user of the addition of options.

The second exemplary embodiment is different from the first exemplary embodiment in that the second exemplary embodiment uses information on the sheet type of the recording material obtained from the sheet type detection unit 50 and accommodating portion information indicating the accommodating portion fed with a sheet after an instruction to feed the sheet is issued in a print job. When the image forming apparatus 100 receives the print job and the recording material is fed, the sheet type detection unit 50 detects the type of recording material. The engine control unit 111 then acquires the information on the type of the fed recording material from the detection result of the sheet type detection unit 50. The engine control unit 111 identifies the type of the fed recording material by comparing the basis weight and the surface property of each type of the recording material stored in the RAM 82 with the detection result of the sheet type detection unit 50. The engine control unit 111 acquires the information (sheet type information) on the type of the recording material detected by the sheet type detection unit 50 and stores such information in the RAM 82. The engine control unit 111 is instructed to feed the sheet in the print job, acquires the accommodating portion information indicating the accommodating portion fed with the sheet, and stores such information in the RAM 82. The information on the type of the recording material stored in the RAM 82 and the information on the accommodating portion fed with a sheet are transmitted by the transmission unit 120 to the server 200 and stored in the storage unit 87.

The information acquired by the engine control unit 111 and stored in the RAM 82 described in the first exemplary embodiment are also transmitted to the server 200 and stored in the storage unit 87 in the second exemplary embodiment. For example, the information described in Table 5 is stored in the storage unit 87. The information items described in the first exemplary embodiment out of the information items described in Table 5 will not be described here. Table 5, unlike Table 1 in the first exemplary embodiment, provides information on the type of the fed recording material detected by the sheet type detection unit 50. Table 5 also describes the accommodating portion information indicating the accommodating portion to which such sheet feeding is instructed by the print job and from which the paper is fed.

TABLE 5

| | | | | | |
|---|---|---|---|---|---|
| | | | Operation history | | |
| Date and Time | Oper- ation | Specified number of prints | Specified size of recording material | Fed sheet type | Accommodating portion |
| 2023 Jun. 1 11:00:00 | Instruct to print | 100 | A4 | Sheet type A | Main body accommodating portion |
| 2023 Jun. 1 12:10:00 | With- drawn | — | — | | Main body accommodating portion |
| 2023 Jun. 1 12:15:00 | Inserted | — | — | | Main body accommodating portion |
| 2023 Jun. 1 12:30:00 | Instruct to print | 300 | A4 | Sheet type B | Main body accommodating portion |
| 2023 Jun. 1 13:10:00 | With- drawn | — | — | | Main body accommodating portion |
| 2023 Jun. 1 13:15:00 | Inserted | — | — | | Main body accommodating portion |
| 2023 Jun. 1 14:00:00 | Instruct to print | 100 | A5 | Sheet type C | Option accommodating portion |
| 2023 Jun. 1 15:00:00 | Instruct to print | 300 | A4 | Sheet type A | Main body accommodating portion |
| . . . | . . . | . . . | . . . | | |
| 2023 Jun. 1 17:15:00 | Inserted | — | — | | Main body accommodating portion |
| 2023 Jun. 1 18:00:00 | Instruct to print | 100 | A4 | Sheet type B | Main body accommodating portion |
| 2023 Jun. 1 18:10:00 | With- drawn | — | — | | Main body accommodating portion |
| 2023 Jun. 1 18:15:00 | Inserted | — | — | | Main body accommodating portion |
| 2023 Jun. 1 19:00:00 | Instruct to print | 300 | A4 | Sheet type A | Main body accommodating portion |

Determination of Option Proposal

Next, the determination of the option proposal in the second exemplary embodiment will be described. An example is described in which the information in Table 5 is transmitted to the server control unit 210 and stored in the storage unit 87. First, the determination unit 86 obtains, from the data in Table 5, the number of times ($\alpha$) that the detection result of the sheet type detection unit 50 differs between the print jobs before and after the state of the accommodating portion changes, in a plurality of the print jobs received by the image forming apparatus 100 during a predetermined period, and determines whether such a number of times is greater than or equal to a predetermined threshold ($\beta$). In the present exemplary embodiment, a plurality of accommodating portions (the main body accommodating portion 21 and the option accommodating portion 41) is provided, and the data for one day is used to determine the number of times that the sheet type is switched in the main body accommodating portion and $\alpha$ is calculated as 4. That is, in the plurality of print jobs received by the image forming apparatus 100 in a predetermined period, that is, the plurality of print jobs in which the sheet is fed from the same accommodating portion (main body accommodating portion 21), the determination unit 86 obtains the number of times that the detection result of the sheet type detection unit 50 differs between the print jobs before and after the state of the accommodating portion changes.

The determination unit 86 then determines whether $\alpha$ exceeds the predetermined threshold $\beta$. In the present exemplary embodiment, $\beta$ is 3 and thus $\alpha > \beta$, and the determination unit 86 determines that $\alpha$ exceeds the threshold $\beta$.

Next, the determination unit 86 determines whether it is possible to add the option to the image forming apparatus 100. If the addition of options is determined to be possible, the notification is provided. Such a process is the same in content as the first exemplary embodiment, and thus, the description is omitted.

FIG. 6 is a diagram illustrating the information displayed in the first display unit 320. As illustrated in FIG. 6, the first display unit 320 displays the content regarding a user's printing tendency, such as frequent exchange of a sheet type. The first display unit 320 displays information about the addition of options being proposed. The first display unit 320 proposes the type and number of options to be recommended. That is, the first display unit 320 displays at least one or more of the proposals of the addition of options and the printing of the user.

Determination Flow

Figure 7:
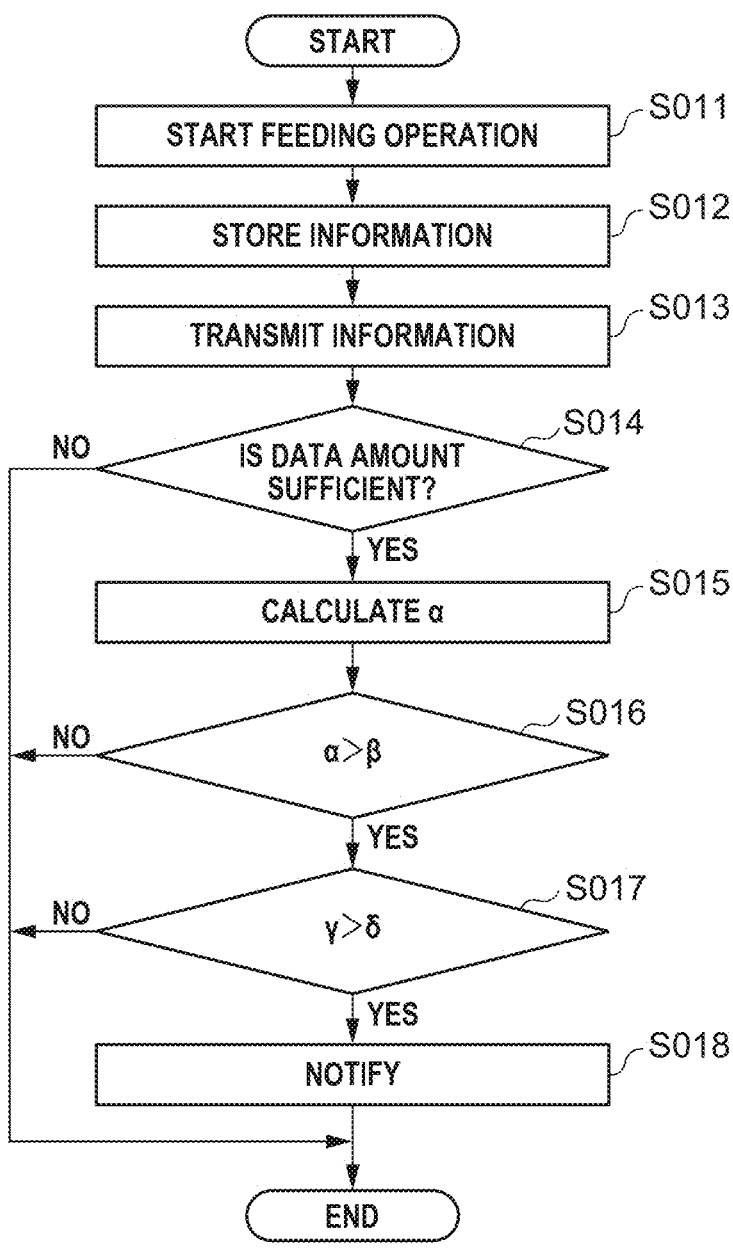
FIG. 7 is a determination flowchart according to the second exemplary embodiment.

Next, a determination flow in the present exemplary embodiment will be described with reference to FIG. 7. When the transmission unit 120 receives a print job, in step S011, the engine control unit 111 drives the sheet feed unit 20 or the option 40 to start a sheet feeding operation. In step S012, the engine control unit 111 stores the received information about the print job in the RAM 82. The engine control unit 111 also periodically acquires the information described above and stores such information in the RAM 82. In step S013, the transmission unit 120 transmits such information (data) to the server 200, and the storage unit 87 stores the information. The frequency at which the information is transmitted to the server 200 may be, for example, once a day, but at any timing.

In step S014, the server 200 determines whether the data to be used for analysis in the determination unit 86 is collected. If enough data is not collected (NO in step S014), no analysis is performed. If enough data is collected (YES in step S014), the analysis is started. In the present exemplary embodiment, the analysis is performed once the data for a day is collected, but the timing of the analysis may be changed as appropriate.

The determination unit 86 obtains the number of times ($\alpha$) that the detection result of the sheet type detection unit 50 differs between the print jobs before and after the state of the accommodating portion changes, in a plurality of the print jobs received by the image forming apparatus 100 during a predetermined period. The determination unit 86 then determines whether $\alpha$ is greater than a predetermined threshold ($\beta$).

In step S016, the determination unit 86 calculates, as described above, the number of times $\alpha$ that the sheet type is switched in the accommodating portion to determine whether $\alpha$ is greater than or equal to the predetermined threshold $\beta$. If $\alpha$ is not greater than the predetermined threshold $\beta$ (NO in step S016), the analysis is ended. If $\alpha$ is greater than or equal to the predetermined threshold $\beta$ (Yes in step S016), the determination unit 86 determines whether it is possible to add the option to the image forming apparatus 100. In the present exemplary embodiment, it is determined, in step S017, whether $\gamma$, which is the maximum number of connectable options, is greater than δ, which is the number of options connected, is determined. If γ is not greater than δ (NO in step S017), the analysis is ended. If γ is greater than δ (YES in step S017), the processing proceeds to step S018. In step S018, the notification unit 88 notifies the information processing apparatus 300 of information for the addition of options. The information processing apparatus 300 having received the notification displays the information about the addition of options notified by the notification unit 88 in the first display unit 320.

As described above, the disclosure according to the second exemplary embodiment makes it possible to understand the usage status of the user and propose options.

It is noted that the configuration of the image forming system 1000 described in the first and second exemplary embodiments is only one example. For example, the image forming system 1000 may not include the option 40 or may include at least one or more options. The image forming system 1000 may also include at least one or more servers.

In the first and second exemplary embodiments, the server 200 includes the determination unit 86 and the notification unit 88, but the image forming apparatus 100 may include the determination unit 86 and the notification unit 88 and the above determination and notification may be performed only by the image forming apparatus 100.

Although the determination unit 86 in the first and second exemplary embodiments each makes different determinations, the determination unit 86 may make both the determinations in the first and second exemplary embodiments.

It is noted that the determination unit 86 in the first and second exemplary embodiments compares the maximum number of connectable options with the number of connected options, but the determination unit 86 may not perform such a comparison.

In the first exemplary embodiment, the sizes of the recording material accommodated in the main body accommodating portion 21 and the option accommodating portion 41 differ, and thus, the maximum number of the A4-sized sheets to be accommodated specified in the print job is the maximum number of sheets to be accommodated of the main body accommodating portion 21. However, if the main body accommodating portion 21 and the option accommodating portion 41 both accommodate the A4-sized recording materials, the maximum number of A4-sized sheets to be accommodated specified in the print job is the total maximum number of sheets to be accommodated of the main body accommodating portion 21 and the option accommodating portion 41.

According to the present disclosure, it is possible to provide a new form of image forming apparatus capable of understanding a usage condition of a user and proposing an option.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-200409, filed Nov. 28, 2023, which is hereby incorporated by reference herein in its entirety.

What is claimed is:

1. An image forming system comprising:
an image forming apparatus including:
a casing configured to accommodate recording materials, the image forming apparatus being configured to receive a print job including number-of-sheets information indicating a number of prints, size information indicating a size of a recording material to be printed, and date-and-time information indicating a date and time of a print, and to form an image on the recording material based on the print job, and
an acquisition unit configured to acquire the number-of-sheets information, the size information, the date-and-time information, in the received print job, and capacity information indicating a maximum number of sheets that the casing can accommodate the recording material having a size specified in the print job;
a determination unit configured to obtain, based on the number-of-sheets information, the size information, the date-and-time information, and the capacity information that are acquired by the acquisition unit, a number of print jobs in which the number of prints exceeds the maximum number of sheets to be accommodated, out of a plurality of print jobs received by the image forming apparatus during a predetermined period, and to determine whether the number of print jobs is greater than or equal to a predetermined threshold; and
a notification unit configured to notify a content about an addition of a new casing in a case where the determination unit determines that the number of print jobs exceeds the predetermined threshold.

2. The image forming system according to claim 1, wherein the casing includes a size detection unit configured to detect a size of the recording material accommodated in the casing.

3. The image forming system according to claim 1,
wherein the image forming apparatus includes a plurality of the casings, and
wherein the maximum number of sheets to be accommodated is the number of sheets obtained by totaling a maximum number of the recording materials to be accommodated in the plurality of casings configured to accommodate the recording material having the size specified in the print job.

4. The image forming system according to claim 1,
wherein the acquisition unit acquires option capacity information indicating a number of options connectable to the image forming apparatus and option connection information indicating the number of options connected to the image forming apparatus,
wherein the determination unit determines, based on the option capacity information and the option connection information, whether the number of options connectable to the image forming apparatus is greater than the number of options connected to the image forming apparatus, and
wherein the notification unit notifies the content about the addition of the new casing in a case where the determination unit determines that the number of print jobs exceeds the threshold, and the number of options connectable to the image forming apparatus is greater than the number of options connected to the image forming apparatus.

5. The image forming system according to claim 1, further comprising a server communicable with the image forming apparatus,
wherein the server includes the determination unit and the notification unit,
wherein the image forming apparatus includes a transmission unit configured to transmit information to the acquisition unit and the server, and wherein the transmission unit transmits the number-of-sheets information, the size information, the date-and-time information, and the capacity information, to the server.

6. The image forming system according to claim 5,
wherein the notification unit notifies an information processing apparatus communicable with the server, and
wherein the information processing apparatus includes a display unit configured to display information, and the information processing apparatus having received the notification displays, in the display unit, the content about the addition of the new casing.

7. The image forming system according to claim 5,
wherein the image forming apparatus includes a display unit configured to display information, and
wherein the notification unit notifies the image forming apparatus, and the image forming apparatus having received the notification displays, in the display unit, the content about the addition of the new casing.

8. The image forming system according to claim 6, wherein the content includes at least one of content for proposing the addition of the new casing and a printing tendency of a user.

9. The image forming system according to claim 1, wherein the image forming apparatus includes the acquisition unit, the determination unit, the notification unit, and a display unit configured to receive a notification from the notification unit and display the content about the addition of the new casing.

10. An image forming system comprising:
an image forming apparatus configured to receive a print job including date-and-time information indicating a date and time of a print to form an image on a recording material based on the print job, the image forming apparatus comprising:
  at least one casing configured to accommodate the recording material;
  a sheet type detection unit configured to detect a type of the recording material fed from the at least one casing; and
  a state detection unit configured to detect whether the at least one casing is in an inserted state or in a withdrawn state with respect to a main body of the image forming apparatus;
an acquisition unit configured to acquire the date-and-time information that is information about a date and time of a print in the received print job, sheet type information indicating a type of the recording material detected by the sheet type detection unit, and state information indicating a state of the at least one casing detected by the state detection unit;
a determination unit configured to obtain, based on the date-and-time information, the sheet type information, and the state information acquired by the acquisition unit, a number of times that a detection result of the sheet type detection unit differs between print jobs before and after the state of the at least one casing changes, in a plurality of print jobs received by the image forming apparatus during a predetermined period, and to determine whether the number of times is greater than or equal to a predetermined threshold; and
a notification unit configured to notify, in a case where the determination unit determines that the number of times exceeds the predetermined threshold, a content about an addition of a new casing.

11. The image forming system according to claim 10, wherein the sheet type detection unit includes at least one of a basis weight detection unit configured to detect a basis weight of the recording material and a surface property detection unit configured to detect a surface property of the recording material.

12. The image forming system according to claim 10,
wherein the at least one casing is a plurality of casings,
wherein the acquisition unit acquires casing information indicating a first casing of the plurality of casing to which a sheet feed is specified in the print job, and
wherein the determination unit obtains, based on the date-and-time information, the sheet type information, the state information, and the casing information, the number of times to determine whether the number of times is greater than or equal to a predetermined threshold.

13. The image forming system according to claim 10,
wherein the acquisition unit acquires option capacity information indicating a number of options connectable to the image forming apparatus and option connection information indicating the number of options connected to the image forming apparatus,
wherein the determination unit determines, based on the option capacity information and the option connection information, whether the number of options connectable to the image forming apparatus is greater than the number of options connected to the image forming apparatus, and
wherein the notification unit notifies the content about the addition of the new casing in a case where the determination unit determines that the number of times exceeds the threshold and the number of options connectable to the image forming apparatus is greater than the number of options connected to the image forming apparatus.

14. The image forming system according to claim 10, further comprising a server communicable with the image forming apparatus, the server including the determination unit and the notification unit,
wherein the image forming apparatus includes a transmission unit configured to transmit information to the acquisition unit and the server, and
wherein the transmission unit transmits the date-and-time information and the sheet type information to the server.

15. The image forming system according to claim 14,
wherein the notification unit notifies an information processing apparatus communicable with the server, and
wherein the information processing apparatus includes a display unit configured to display information, and the information processing apparatus having received the notification displays, in the display unit, the content about the addition of the new casing.

16. The image forming system according to claim 14,
wherein the image forming apparatus includes a display unit configured to display information, and
wherein the notification unit notifies the image forming apparatus, and the image forming apparatus having received the notification displays, in the display unit, the content about the addition of the new casing.

17. The image forming system according to claim 15, wherein the content includes at least one of content for proposing the addition of the new casing and a printing tendency of a user.

18. The image forming system according to claim 10, wherein the image forming apparatus includes the acquisition unit, the determination unit, the notification unit, and a display unit configured to receive a notification from the notification unit and to display the content about the addition of the new casing.

\* \* \* \* \*